United States Patent [19]

Hase

[11] 4,274,137

[45] Jun. 16, 1981

[54] INVERTER CIRCUITS

[76] Inventor: Alfred M. Hase, 6 Manorwood Rd., Scarborough, Ontario, Canada

[21] Appl. No.: 76,859

[22] Filed: Sep. 19, 1979

[51] Int. Cl.³ .................................................. H02M 7/515
[52] U.S. Cl. ........................................ 363/139; 363/136
[58] Field of Search ................ 331/113 A; 363/24–28, 363/56, 57, 96, 97, 133, 134, 136, 139, 155

[56] References Cited

U.S. PATENT DOCUMENTS

| 3,931,565 | 1/1976 | Hase | 363/139 |
|---|---|---|---|
| 3,973,165 | 8/1976 | Hester | 331/113 A X |

Primary Examiner—William M. Shoop
Attorney, Agent, or Firm—Donald E. Hewson

[57] ABSTRACT

An inverter circuit, having a DC input and an AC output, has an input circuit portion which includes an isolating diode and an input filter including a choke and a polarized capacitor across the DC input. The DC chopper portion of the inverter circuitry may be either center-tapped—where half of the primary winding is in the circuit at any one time—or bridge-type—where all of the primary winding is in the circuit at any instant. In any event, the chopper portion of the inverter circuit uses SCR's and has 180 electrical degree commutation; with a commutation capacitor across the primary winding of the output transformer and a commutation choke in series with the SCR's. Feedback is provided by feedback diodes which are connected in counter-polarity to the polarized input capacity. The commutating capacitor is a lower impedance AC capacitor; and the transformer has an air gap in the core so as to preclude DC saturation, and has a primary winding designed to eliminate leakage flux by being either interleaved, or preferably, bifilar winding. The SCR's are direct-coupled to the primary winding.

5 Claims, 5 Drawing Figures

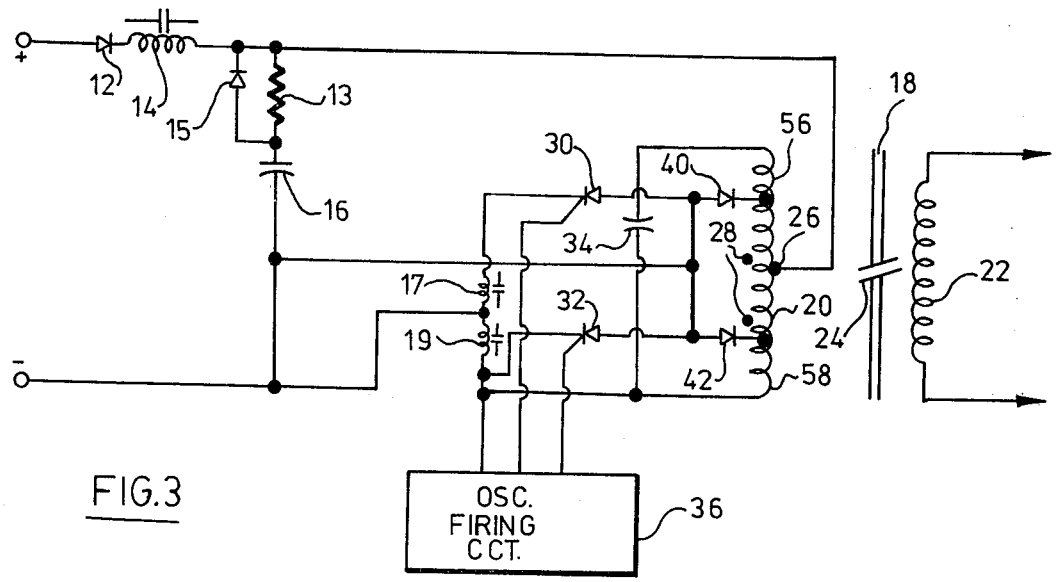
FIG.3
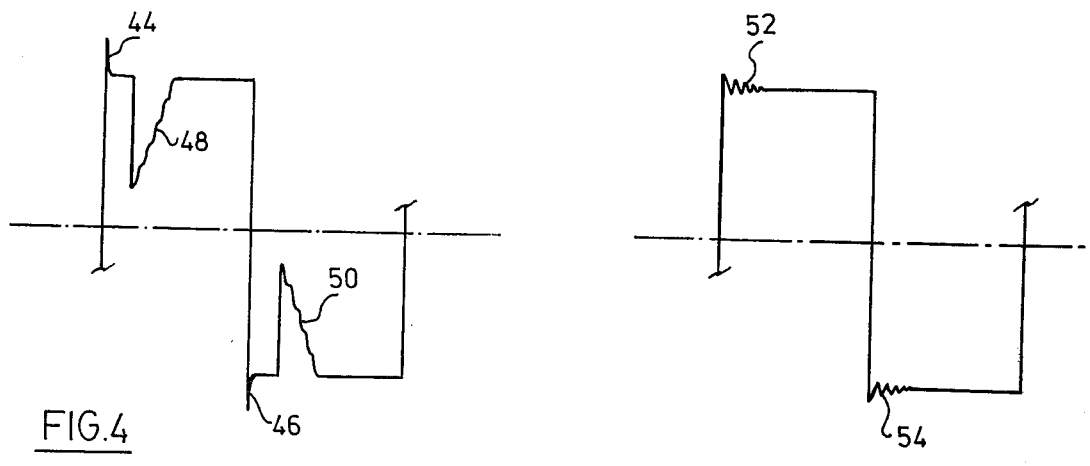
FIG.4
FIG.5

INVERTER CIRCUITS

FIELD OF THE INVENTION

This invention relates to inverter circuitry whereby direct current input is converted to an alternating current output; and in particular, this invention teaches circuits for inverters which have fixed firing, with direct current commutation, where the commutation and frequency of the circuit are independent of the load conditions of the inverter. A particular feature of the present invention is that the silicon controlled rectifiers in the firing circuit are directly connected to the primary winding of the transformer, giving a more energy efficient circuit than heretofore.

BACKGROUND OF THE INVENTION

Power converters for conversion of DC power to AC power—known as inverters—have long been known. More recently, SCR-type inverters have become very widely used, particularly such inverters having low, industrial frequency outputs (generally 60 Hz or 400 Hz), but having very high power ratings.

However, prior art inverter circuitry has provided a number of disadvantages, including particularly high distortion output, or high capital costs particularly because of the necessity to provide physically very large filter circuits. In addition, prior art inverters have been known to become unstable, particularly when subject to a dynamic load, i.e. one which may very rapidly as to its power requirements, or its power factor, or with sudden changes of the DC input voltage legal; and what has happened is that the AC output may undershoot or overshoot, or ringing may occur in the output or chopper circuit, following by hunting and feedback loop instability. In such cases, the output might collapse, the SCR's may misfire, and the inverter fails.

More especially, however, particularly with inverters of the sort which are particularly taught in applicant's U.S. Pat. No. 3,931,565, issued Jan. 6, 1976, is that a high stability has been achieved, and a low distortion output has been achieved—particularly when operated with Ferroresonant Voltage Regulating Circuits of the sort taught in applicant's U.S. Pat. No. 3,824,449 issued July 16, 1974 and applicant's U.S. Pat. No. 4,142,141 issued Feb. 27, 1979. Such inverter circuits as those previously taught by the applicant have, usually, 180 electrical degree commutation which effectively frees the inverter from effects of changes of power factor of the load, so that current and voltage stresses within the commutation circuits of the inverter are substantially constant and are predictable. However, it has been noted that, as with nearly all inverter circuits, greater energy efficiency would be desireable, and it has been determined that energy efficiency can be increased by the elimination of certain components used in prior art circuits, including those of the applicant.

It has, however, been noted that it is not enough merely to eliminate components such as by elimination of the de-coupling diodes as previously used, and as discussed in greater detail hereafter; additional circuit changes must also be made to the effect that voltage stresses on the components must be reduced as output currents increase to full load values; and such effects have unexpectedly been achieved by virtue of the elimination of the de-coupling diodes together with the provision of a non-DC-saturating chopper transformer—i.e., a transformer having an air gap in its core—and also the provision of a very low impedence commutating capacitor and a primary winding on the chopper transformer which is such as to suppress leakage flux. In general, the manner by which leakage flux is suppressed is by the provision of a bifilar primary winding on the chopper transformer; however, the provision of an interleaved winding would also achieve the same effect.

A further advantage that has been achieved by the provisions of circuits according to the present invention has been that, with a suitably dimensioned and rated air gap and primary winding on the chopper transformer, once commutation has started the commutation choke can be eliminated by short circuiting or otherwise, while still maintaining commutation of the chopper circuit.

By virtue of the elimination of the de-coupling diodes, a much better square-wave output of the chopper circuit may be achieved, thereby providing still greater energy efficiency and better sinusoidal wave forms from the output.

Because there is less voltage stress on the SCR's, as discussed hereafter, particularly on overload or short circuit conditions, an inverter according to the present invention demonstrates a greater or improved MTBF (mean time between failures) rating.

Other features of the present invention are the inclusion of input circuitry which limits inrush current and permits very fast start up of the inverter. Such "soft start" circuitry creates less stress on the DC power source, as well as stress on the components in the commutation circuits. Additionally, the circuits of the present invention provide very fast commutation, and the total commutation circuit setup is such as to provide quite sufficient head room in the event of instability in the power source, and particularly so as to provide better square-wave output.

Thus, the present invention comprises an inverter circuit, as described above, having the combination of at least:

(a) an input diode connected to the DC source for the inverter, and having its polarity arranged so as to be normally conductive;

(b) an input filter choke in series with the DC input and the input diode;

(c) an input, polarized capacitor across the DC input, with its positive side facing the positive side of the DC source;

(d) a pair of SCR's facing in the same direction with respect to the DC input, and having a low impedence, unpolarized, AC commutation capacitor facing the SCR's on the side of each thereof which is remote from the DC source;

(e) a drive circuit for the SCR's arranged so that, at any time, one or the other of the SCR's is conductive;

(f) a transformer—which is essentially a DC chopper transformer—arranged with its primary winding connected so that at any instant of time at least a portion of the primary winding is in series with the SCR which is conductive at that instant; the AC output of the basic inverter circuitry being taken from the secondary winding of the transformer;

(g) a commutation choke in series with the SCR's and connected in such a manner that each of the SCR's is in series with at least a portion of the commutation choke;

(h) and a feedback circuit which comprises at least one diode arranged in counter-polarity to the polarized input capacitor and connected to the opposite polarity side of the polarized input capacitor, with the other side of the diode facing the primary winding of the transformer.

As stated, the transformer is such as to have either a bifilar or interleaved primary winding, and an air gap.

The above is a basic description of the principal arrangement of basic circuits according to the present invention. However, the DC chopper transformer may be a center-tapped transformer where each of the SCR's faces one or the other of the ends of the primary winding of the transformer, and the primary winding is center-tapped to one side of the DC input; or the DC chopper may be of the bridge variety having two pairs of SCR's where both SCR's of each pair face in the same direction and the pairs are oppositely faced with respect to the DC input, and where each of the SCR's in each pair faces one or the other of the ends of the primary winding of the transformer. In the latter circumstances—i.e., in the case of a bridge-type DC chopper—one or the other of each of the pairs of SCR's is conductive at any instant of time, in a manner so that both ends of the primary winding of the DC chopper transformer face a conductive SCR at all times.

Still further, while the discussion which follows is particularly related to a 180 electrical degree commutation, other types of commutation may be provided such as by the addition of an appropriately connected primary circuit for the transformer and additional SCR and firing circuits, so that a 120 electrical degree, 3-phase inverter is provided.

BRIEF DESCRIPTION OF THE DRAWINGS

The purposes, features and objects of the present invention are described in more detail hereafter, in association with the accompanying drawings, in which:

FIG. 3 shows an alternative circuit arrangement to that of FIG. 1 with a different commutation capacitor arrangement; and, FIGS. 4 and 5 show typical wave forms for prior art inverter circuitry and an inverter according to the present invention, respectively.

DESCRIPTION OF THE PREFERRED EMBODIMENTS

As noted above, inverter circuits according to the present invention provide a high reliability inverter circuit which may have either a center-tapped DC chopper or a bridge-type DC chopper. Particularly, however, inverter circuits according to the present invention provide a more energy efficient DC to AC conversion than heretofore, with better MTBF ratings.

Figure 1:
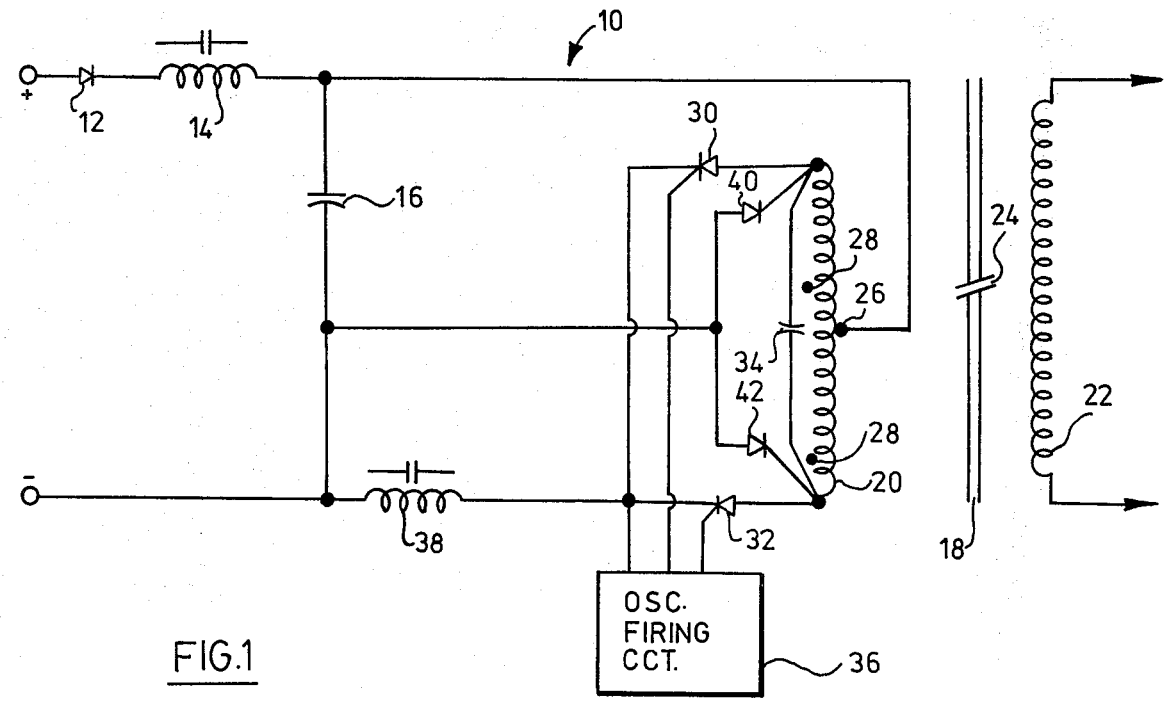
FIG. 1 illustrates a basic circuit in accordance with this invention.
Figure 2:
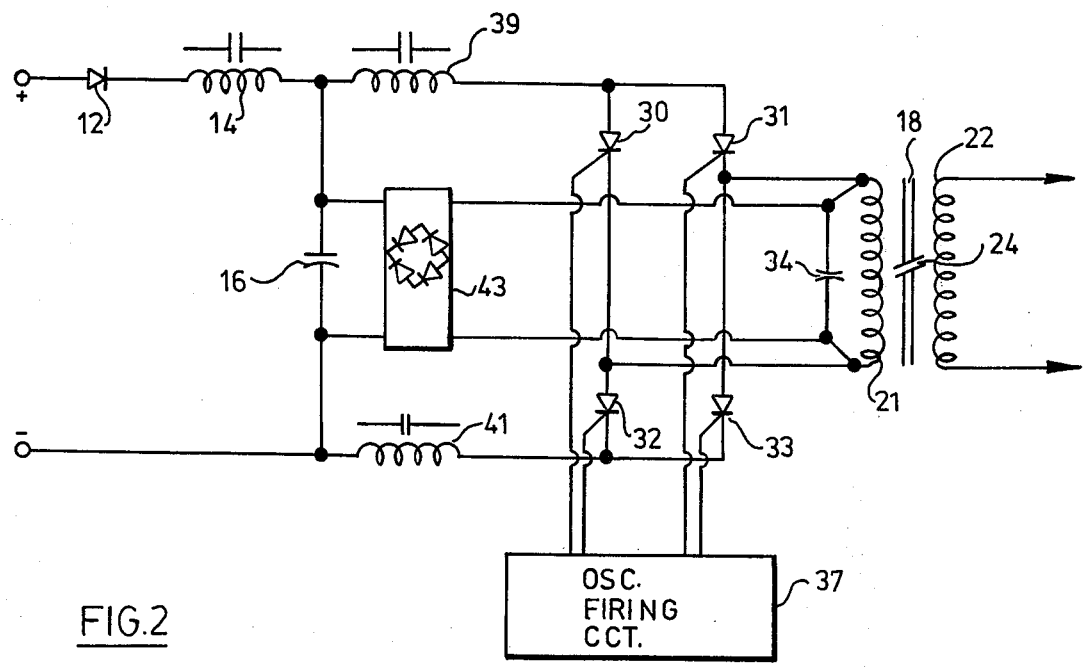
FIG. 2 shows a basic bridge-type alternative arrangement of the circuit of FIG. 1.

For the most part, the discussion hereafter relates to the basic circuit of FIG. 1. FIGS. 2 and 3 are shown so as to give certain basic alternative configurations, namely a bridge configuration and an alternative commutating arrangement using an overwind on the primary of the chopper transformer.

In the basic circuit 10 of FIG. 1, there is an input diode 12 connected to the positive side of the direct current source, and arranged so as to be conductive under normal operating conditions of the inverter. An input filter choke 14 is connected in series with the input diode 12, and is therefore in series with the DC input. A polarized capacitor 16 is connected across the direct current input, following the input filter choke 14, with the positive side of the polarized capacitor 16 facing the positive side of the DC input.

Additional circuit components may be provided, by way of a resistor 13 and diode 15 in parallel, the parallel connection being in series with the positive side of the input capacitor 16 with the additional diode in opposed relationship to the diode 12; as illustrated in the circuit of FIG. 3. The additional resistor and diode are particularly useful for ensuring soft start operation of the inverter.

In any event, a chopper transformer is provided having a core 18, primary winding 20 and secondary winding 22. An air gap 24 is provided in the core 18. The primary winding 20 is center-tapped at 26; and the winding on the primary winding 20 is such that the phasing of the current flow in the primary winding is as shown by the phasing marks 28—i.e., that the opposite ends of the primary winding are out of phase with each other, with respect to the current flow from the positive side of the DC input.

A pair of silicon controlled rectifiers 30 and 32 is provided, each of which is facing in the same direction with respect to the direct current input. In the circuit of FIG. 1, the SCR's 30 and 32 are connected to the ends of the primary winding 20 of the chopper transformer. Connected between the sides of the SCR's 30 and 32 which are remote from the DC source is an unpolarized commutation capacitor 34. As seen in FIG. 1, the commutation capacitor 34 is connected across the ends of the primary winding 20.

An oscillator firing circuit, or drive circuit, 36 is provided, and it is connected to the gates of the SCR's 30 and 32, and to their cathodes, so as to drive them in a manner such that, at any time, one or the other of the SCR's 30 or 32 is conductive. In other words, the drive circuit 36 is connected to the gates of the SCR's 30 and 32 in such a manner that, having regard to the AC output of the DC chopper which comprises the SCR's, each of the SCR's is driven for 180 electrical degrees with respect to that output. The nature of the drive circuit is not material to the present invention, and the drive circuit may be of any suitable sort which is adapted to drive the SCR's which may have very high power ratings, and which may operate at standard power frequencies such as 60 Hz or 400 Hz.

A commutation choke 38 is shown in FIG. 1 as being in series with the SCR's 30 and 32. The commutation choke may also be replaced with a dual choke in such a manner that at least a portion of the choke is in series with each of the SCR's 30 and 32, such as at 17 and 19 in FIG. 3.

A feedback circuit is provided, having a pair of diodes 40 and 42 which are connected to the ends of the primary winding 20 of the chopper transformer; or alternatively, the feedback diodes 40 and 42 may be connected to taps so that not the entire primary winding is between the connections of the feedback diodes to the primary winding. In any event, the feedback diodes 40 and 42 are connected in counter-polarity to the polarized capacitor 16—i.e., the anodes of the feedback diodes 40 and 42 are connected to the negative side of the polarized capacitor 16; and the cathode sides of the diodes which are remote from the polarized capacitor 16 face the primary winding 20 of the chopper transformer.

What has been discussed, so far, are the basic components of the inverter circuits according to this invention, at least so far as the use of a center-tapped primary winding on the chopper transformer is concerned. The circuit is substantially free of the effects of variation of the DC input voltage, or of power factor or changing power factor of the AC load, or of dynamic load changes. The DC input is completely isolated from the AC output, as is the feedback loop. Because of the 180 electrical degree firing of the SCR's, it is possible to obtain an output frequency from the invertor circuit which is independent of the AC load or of the DC input voltage level. Further, the reactive load which may be reflected back into the primary winding of the chopper transformer is fed back by the diodes 40 and 42; and is recovered as rectified, DC power. The efficiency of the inverter circuits is thereby increased.

What is particularly surprising, however, is that quite unexpectedly it has been noted that there is considerably less voltage stress on the SCR's 30 and 32 as the currents which they carry increase up to full load values. This is noted when the commutating capacitor 34 has a very low impedence, where the primary winding 20 is such as to suppress flux, and there is an air gap 24 in the core 18 of the chopper transformer.

By direct coupling the SCR's 30 and 32 to the primary winding 20 of the transformer, approximately two volts per diode times the current forced through them is saved. Accordingly, a higher energy efficiency is achieved.

Moreover, as noted above, it has been unexpectedly noted that there is considerably less voltage stress on the SCR's as the currents forced through them go up. This provides for a much better square-wave output of the chopper portion of the circuits. The presence of the air gap 24 prevents DC saturation of the core 18 of the transformer, thereby assuring that the DC component of the square-wave output does not saturate or cause unpredictable non-linearities of operation of the transformer. These factors, taken with the fact that the primary winding is either bifilar or interleaved so as to suppress leakage flux, provide an operation whereby once commutation has been established, the commutation choke 38 can be short circuited, thereby providing greater efficiency by eliminating further losses in the choke.

Still further, the square-wave output is considerably better as shown in the comparative curves in FIGS. 4 and 5. FIG. 4 shows a typical output wave form of a circuit such as those shown in applicant's aforementioned U.S. Pat. No. 3,931,565. There is overshoot 44 and 46, and a feedback dip 48 and 50, on both the positive going and negative going sides of the output waveform. By comparison, only a minor amount of overshoot or hunting or shudder 52 and 54 are shown in the waveform of FIG. 5 which is typical of the output waveform of the circuit of FIG. 1 (or FIGS. 2 and 3 as discussed hereafter). It can be seen, therefore, that the peak inverse voltage stresses on the SCR's 30 and 32 may be reduced to less than half the peak inverse voltage stresses to which they may have been previously subjected.

Turning now to FIG. 2, the bridge circuit equivalent or analog to the circuit of FIG. 1 is shown. In the circuit of FIG. 2, the commutation chokes 39 and 41 are in series with pairs of SCR's 30, 31 and 32, 33, respectively. The gates of the SCR's 30, 31, 32 and 33 are all connected to an oscillator firing circuit or driving circuit 37. The commutation capacitor 34 remains across the ends of the primary winding 21 of the transformer, or taps placed on the primary winding 21; and it will be noted that the ends of the primary winding 21 are connected to the SCR's 31 and 32. The driving circuit 37 and the SCR's are arranged in such a manner that either SCR's 30 and 33 or SCR's 31 and 32 are conductive, so that the primary winding 21 is always in the circuit. The feedback for the circuit of FIG. 2 is provided by the diode bridge 43.

The alternative circuit which is shown in FIG. 3 substantially duplicates that of FIG. 1, except as discussed above; and that a pair of overwinds 56 and 58 is provided on the primary winding 20 of the transformer, with the commutation capacitor 34 being connected across the overwind.

An improved SCR-operating inverter circuit has been described, having greater energy efficiency than prior circuits, with better square-wave output and therefore improved sinusoidal AC output. The operating characteristics of the circuits are substantially predictable, and because there is considerably less voltage stress and inverse voltage stresses on the circuit components, particularly the SCR's, a higher MTBF rating is achieved.

Obviously, a three-phase operation is possible by provision of 120 electrical degree firing circuits and the appropriate SCR, commutation and transformer circuits. Likewise two or more output circuits may be powered from a single chopper. The use of bifilar or interleaved primary windings has been contemplated, an alternative overwind circuit arrangement has been shown as well as a bridge analog, and other modifications and amendments may be made, without departing from the spirit and scope of the appended claims.

I claim:

1. In an inverter circuit having a direct current input and an alternating current output, the combination comprising:
   (a) an input diode connected to said direct current source with its polarity arranged so as to be conductive under normal operation conditions of said inverter;
   (b) an input filter choke in series with said direct current input and said input diode;
   (c) a polarized capacitor across said direct current and said input diode and input choke, with the positive side of said capacitor facing the positive side of said direct current source;
   (d) a pair of silicon controlled rectifiers facing in the same direction with respect to said direct current input, and an unpolarized commutation capacitor connected so as to be facing the side of each of said silicon controlled rectifiers which is remote from said direct current source;
   (e) a drive circuit connected to the gates of said silicon controlled rectifiers so as to drive said silicon controlled rectifiers in a manner so that, at any time, one or the other of them is conductive;
   (f) a transformer having a primary and a secondary winding, and a core with an air gap, where said primary winding is connected so that at any instant at least a portion thereof is in series with the silicon controlled rectifier which is conductive at that instant, and where said alternating current output is from said secondary winding;

(g) a commutation choke in series with said silicon controlled rectifiers and connected so that each of said silicon controlled rectifiers is in series with at least a portion of said commutation choke;

(h) and a feedback circuit comprising at least one diode arranged so as to be in counter-polarity to said polarized capacitor and connected to the opposite polarity side of said polarized capacitor at one side of said diode, and facing the primary winding of said transformer at the other side of said diode;

said inverter circuit thereby having fixed frequency, 180 electrical degrees direct current commutation, where the commutation is independent of the load conditions on said inverter; and having closed loop feedback which is electrically isolated from the load on said converter; and where said unpolarized commutation capacitor is a very low impedence capacitor; and said primary winding of said transformer is wound in such a manner as to substantially eliminate leakage flux.

2. The inverter circuit of claim 1 where the primary winding of said transformer is bifilar.

3. The inverter circuit of claim 1 where the primary winding of said transformer is interleaved.

4. The inverter circuit of claim 2 where said primary winding of said transformer is center-tapped, with the center tap in series with one side of said direct current input, and with the ends of said primary winding being each in series with one of said silicon controlled rectifiers, the connection being such that the connections of said silicon controlled rectifiers to said ends of said primary winding are out of phase with each other with respect to the polarization direction of the winding.

5. The inverter circuit of claim 1 where an overwind coil is placed on said primary winding of said transfer, and said low impedence AC commutation capacitor is connected across said overwind coil and said primary winding.

* * * * *